United States Patent
Mark et al.

(10) Patent No.: US 11,660,568 B2
(45) Date of Patent: May 30, 2023

(54) COMPRESSED AIR DRYING UNIT

(71) Applicant: Ingersoll-Rand Industrial U.S., Inc., Davidson, NC (US)

(72) Inventors: Henry Y. Mark, Philadelphia, PA (US); Scott A. Johnson, Honey Brook, PA (US); Stefano Vezil, Trieste (IT)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 305 days.

(21) Appl. No.: 17/025,446

(22) Filed: Sep. 18, 2020

(65) Prior Publication Data
US 2022/0088533 A1    Mar. 24, 2022

(51) Int. Cl.
*B01D 53/26* (2006.01)
*F26B 23/00* (2006.01)
*F26B 11/02* (2006.01)

(52) U.S. Cl.
CPC ......... *B01D 53/266* (2013.01); *B01D 53/265* (2013.01); *F26B 23/004* (2013.01); *B01D 2257/80* (2013.01); *F26B 11/028* (2013.01)

(58) Field of Classification Search
CPC ............... B01D 53/266; B01D 53/265; B01D 2257/80; B01D 2258/06; F26B 23/004; F26B 11/028
USPC ............................................................ 34/73
See application file for complete search history.

(56) References Cited

U.S. PATENT DOCUMENTS

| | | | | |
|---|---|---|---|---|
| 9,021,817 B2* | 5/2015 | Hoerner | ................ | B23K 31/02 62/291 |
| 2006/0107669 A1* | 5/2006 | Radisch | ............... | B01D 53/265 62/93 |
| 2013/0000341 A1 | 1/2013 | De Piero et al. | | |
| 2013/0269910 A1* | 10/2013 | De Piero | ............. | B01D 53/265 165/104.11 |

FOREIGN PATENT DOCUMENTS

EP      2684000 A1     1/2014

OTHER PUBLICATIONS

Extended European Search Report for European Application No. 21170875.5, dated Oct. 28, 2021.

* cited by examiner

*Primary Examiner* — John P McCormack
(74) *Attorney, Agent, or Firm* — Advent, LLP; Kevin E. West

(57) ABSTRACT

An air drying unit for compressed air systems is provided. The air drying unit has a precooler/reheater, a main cooler and a moisture separator. Incoming air is cooled to cause moisture within the compressed air to condense, which is then separated to dry the compressed air. The precooler/reheater, main cooler and moisture separator are designed as an integral unit that does not require pipes to connect the components together. Instead, compressed air flows through the sealed unit through passages therein between the precooler/reheater, main cooler and moisture separator.

20 Claims, 4 Drawing Sheets

COMPRESSED AIR DRYING UNIT

BACKGROUND

The present inventions relate generally to industrial air dryers for compressed air systems.

Compressed air is commonly used in factories to power pneumatic tools and to blow air onto various surfaces for cleaning, expanding bags, moving parts, etc. Typically, factories have a centralized compressed air system installed that feeds a network of compressed air piping that supplies numerous tools or stations with compressed air. Thus, one or more centralized air compressors may be used to supply an entire factory space with compressed air.

However, it is known that air compressors which draw air from the surrounding atmosphere also introduce moisture into the compressed air from the water vapor naturally contained in atmospheric air. Moisture within compressed air used in factories can cause numerous problems. For example, in the case of power tools that use compressed air as a power source, moisture within the supplied compressed air can cause corrosion of the internal components of the tool. In addition, where compressed air is blown onto surfaces, any moisture within the compressed air will also be blown onto the surface along with the blown air. This can be particularly problematic where it is a requirement that the surface remain dry, such as food packaging operations, and can also be a problem with delicate surfaces that might be damaged by water particles within the compressed air.

Due to the problems associated with moisture within compressed air systems, various types of air drying systems may be used in industrial factories to remove moisture contained within compressed air. While such systems are useful and adequately address the potential problems associated with moisture in compressed air, such systems can be large in size and are not always effective in matching the required compressed air demand. Thus, it would be desirable to provide improved air drying systems for industrial factories, including small and large applications where dried compressed air is needed.

SUMMARY

An air drying unit for compressed air systems is described. The air drying unit includes a precooler/reheater that cools compressed air flowing in from an air inlet and warms compressed air flowing out of an air outlet. The precooled air flows from the precooler/reheater to a main cooler which cools the compressed air with a coolant. Moisture which condenses from the compressed air due to cooling thereof is separated from the compressed air by a moisture separator to dry the compressed air. The dried air then flows back through the precooler/reheater to warm the compressed air before flowing out through the air outlet. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 2:
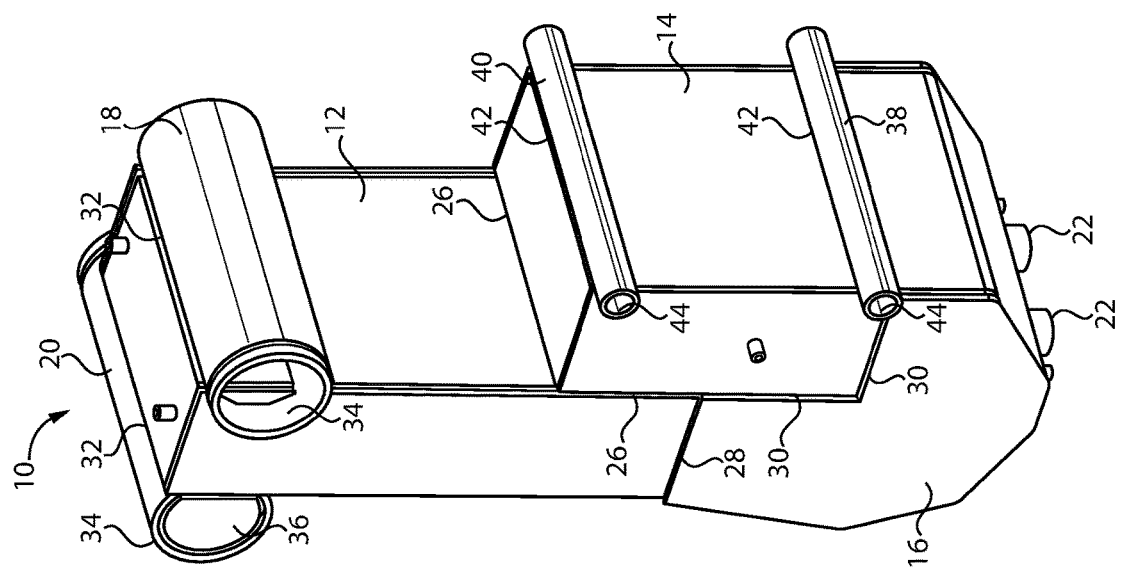
FIG. 2 is another perspective view of the air drying unit from the reverse side.
Figure 1:
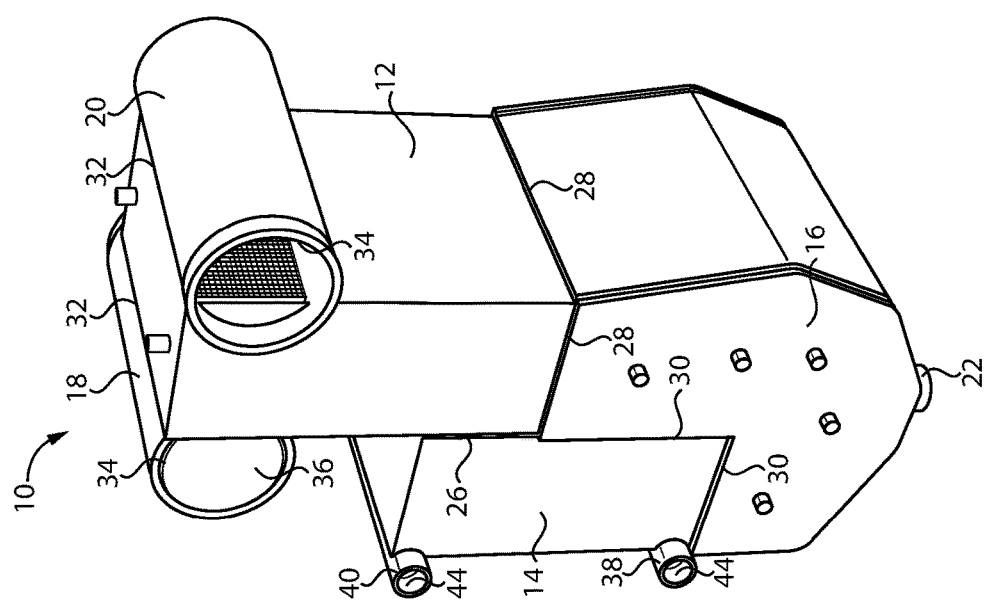
FIG. 1 is a perspective view of an air drying unit.
Figure 3:
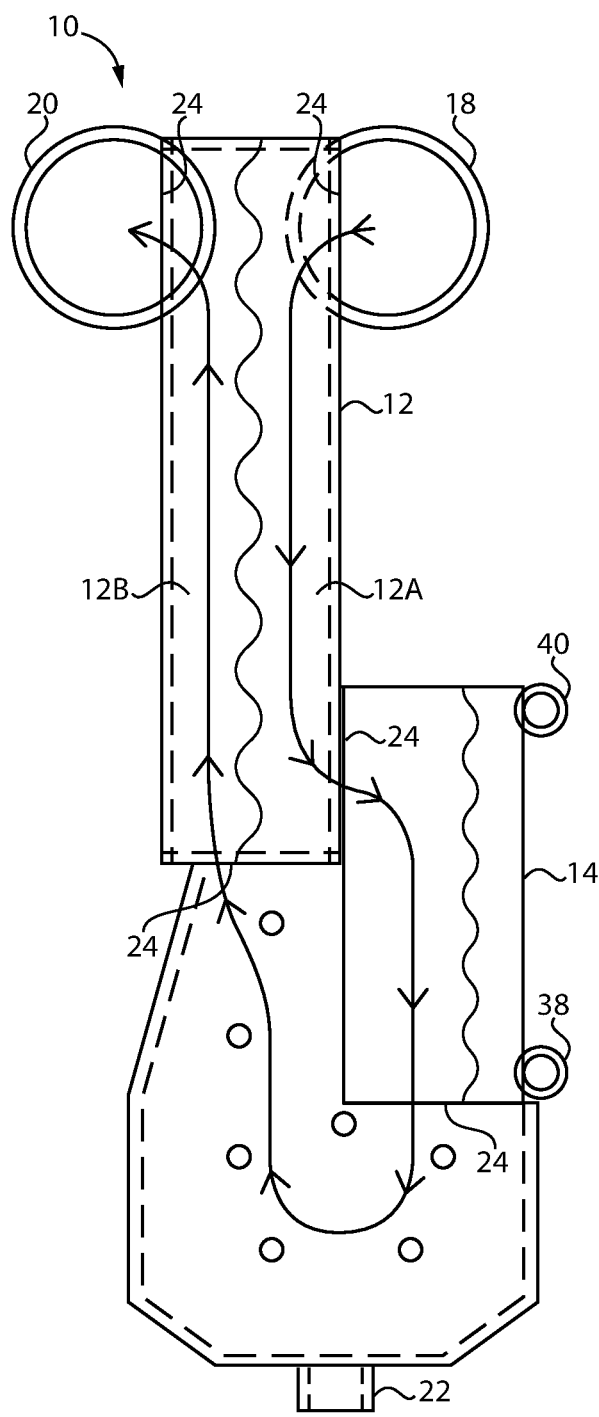
FIG. 3 is a schematic view of the air drying unit showing compressed air flow through passages within the air drying unit.
Figure 4:
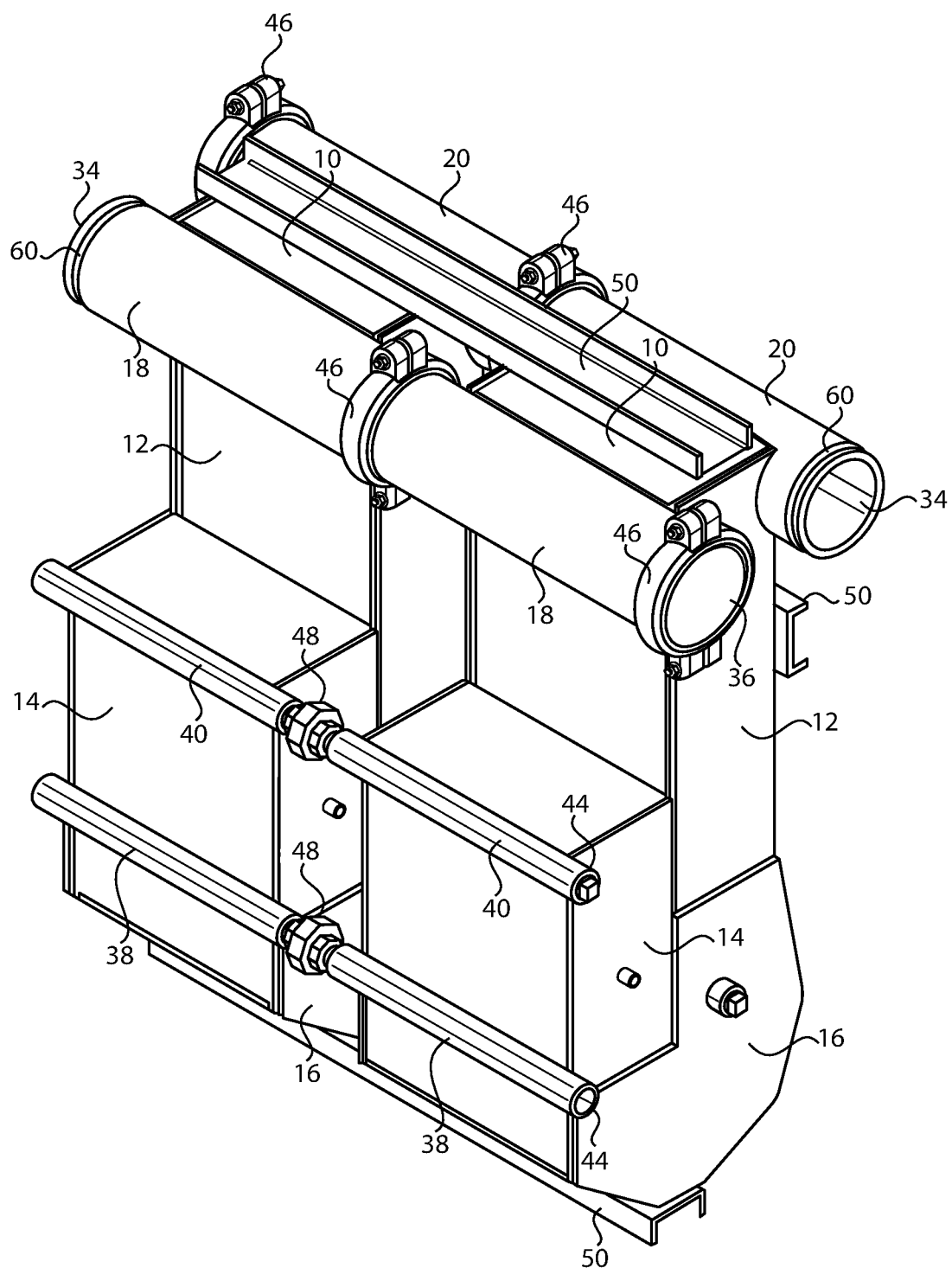
FIG. 4 is a perspective view of multiple air drying units connected together.

Referring now to the figures, an air drying unit 10 is provided with three main components. That is, the air drying unit 10 has a precooler/reheater 12, a main cooler 14 and a moisture separator 16. In operation, compressed air from the air inlet 18 enters the precooler side 12A of the precooler/reheater 12. The air then exits the precooler/reheater 12 and enters the main cooler 14. After cooling the compressed air, the air enters the moisture separator 16. The moisture separator 16 may be within the main cooler 14 or may be a separate component located after the main cooler 14. The air then reenters the precooler/reheater 12 on the reheater side 12B, and thereafter, exits the air drying unit 10 through the air outlet 20.

The precooler/reheater 12 is a heat exchanger 12 that exchanges heat between the incoming air flow and the outgoing air flow. That is, the incoming compressed air flow is warm relative to the outgoing compressed air flow. As described below, the air is cooled within the drying unit 10 to withdraw moisture from the air. Thus, the precooler/reheater 12 increases efficiency by cooling the incoming air with the outgoing air prior to additional cooling that occurs thereafter. Also, it is undesirable for the outgoing air to be too cool since this would cool the compressed air piping and cause condensation of water vapor on the exterior of the piping. Thus, the precooler/reheater 12 prevents this from happening by heating the outgoing compressed air using the warm incoming compressed air. The energy required to cool the compressed air in the main cooler 14 is also reduced. It is also possible to reduce the size of the main cooler 14 due to the precooling that is done to the compressed air.

The main cooler 14 is another heat exchanger 14 that performs the primary cooling of the compressed air. Cooling of the incoming compressed air by the main cooler 14 is necessary in order to cause gaseous moisture (i.e., humidity) within the air to condense to a fluid (e.g., water) in order to allow the moisture to be removed from the air. The main cooler 14 (which may be referred to as a chiller section) may cool the compressed air in various ways. In one embodiment, the main cooler 14 may use a liquid coolant, such as a glycol and water mixture, to cool the compressed air. In this case, the main cooler 14 is a liquid-air heat exchanger 14. Alternatively, the main cooler 14 may use a refrigerant to cool the compressed air. Thus, in this case, the refrigerant side of the main cooler 14 may be considered to be an evaporator where the refrigerant evaporates and absorbs heat from the compressed air side of the main cooler 14. It is also possible to have main coolers 14 that utilize a liquid coolant and a refrigerant.

After the incoming compressed air has been cooled by the main cooler 14 (e.g., to below 5° C. and as low as 0° C.), the moisture separator 16 withdraws moisture from the compressed air. In the preferred embodiment, the moisture separator 16 is located below the main cooler 14. Thus, gravity may be used to allow the condensed fluid to be removed through a drain 22. In this arrangement, the compressed air which has been dried by removing moisture therefrom (and which may now be considered the outgoing compressed air) may change direction, e.g., a U-turn, and flow upwards from the moisture separator 16. It is understood that where multiple drying units 10 are used together, the drains 22 of the units 10 may be connected together to provide a single drain system.

The outgoing compressed air then enters the reheater side 12B of the precooler/reheater 12 and exits the drying unit 10 through the air outlet 20. It is understood that air flow through the air drying unit 10 need not be separately forced or circulated therethrough, but instead may flow through the drying unit 10 as air is used by the compressed air demand and replaced by the compressed air supply. That is, any compressed air that flows to the compressed air demand from the compressed air supply must first pass through the drying unit 10 (or another drying unit 10 in the system) due to the location of the drying unit 10 between the supply and demand.

The drying unit 10 is designed to be compact and an integral unit. Thus, the unit 10 may be smaller than other conventional air dryers with equivalent capacity. That is, the precooler/reheater 12, main cooler 14 and moisture separator 16 are all interconnected together in a unit 10 without being connected together with pipes and pipe couplers or fasteners. Instead, air flows between the precooler/reheater 12, main cooler 14 and moisture separator 16 through internal passages 24 within the drying unit 10. In order to contain the air within the unit 10, it is necessary to ensure that the unit 10 is sealed sufficiently to contain compressed air (e.g., 100-200 psi). While the unit 10 may be made as a monolithic unit incorporating the precooler/reheater 12, main cooler 14 and moisture separator 16, it may be preferred that the components be welded (e.g., brazed) together so that the components are permanently connected together in sealed together (i.e., the internal passages 24 are sealed by the welds). For example, the precooler/reheater 12 may be welded 26 to the main cooler 14 and may be welded 28 to the moisture separator 16. The main cooler 14 may also be welded 30 to the moisture separator 16.

In order to make the drying unit 10 vertically compact, it may be desirable to partially overlap the precooler/reheater 12 vertically with the main cooler 14. That is, the bottom end of the precooler/reheater 12 may be laterally adjacent the top end of the main cooler 14. A more traditional arrangement would be to arrange the precooler/reheater 12 on top of the main cooler 14 so that the incoming compressed air flows downward from the precooler/reheater 12 to the main cooler 14. However, in the preferred embodiment, the precooler/reheater 12 and main cooler 14 are offset from each other and partially overlapping in a side-by-side arrangement so that the incoming compressed air changes direction at the end of the precooler/reheater 12 to flow laterally from the precooler/reheater 12 to enter the main cooler 14. As a result, the height of the drying unit 10 can be reduced.

In order to make the drying unit 10 modular and more easily used with multiple drying units 10 as described further below, the air inlet 18 and air outlet 20 may be pipes 18, 20 extending across the width of the unit 10. In this arrangement, the axes of the pipes 18, 20 (which extend parallel to each other) extend in one direction across the unit 10, but the compressed air must flow laterally with respect to the pipe axes in order to enter and exit the drying unit 10. This may be accomplished by cutting a side opening through each pipe 18, 20 to fit the pipe 18, 20 against the drying unit 10 and welding 32 the pipe 18, 20 to the drying unit 10. Thus, the compressed air flows laterally from or to the respective pipe 18, 20 to enter and exit the drying unit 10.

The openings 34 at the opposite ends of the pipes 18, 20 may be used to connect the drying unit 10 to the compressed air supply and compressed air demand. Preferably, the inlet pipe 18 and the outlet pipe 20 have equal lengths and are preferably longitudinally aligned with each other so that the end openings 34 of the two pipes 18, 20 extend out from the drying unit 10 the same length. It may be desirable to close one end 34 of each pipe 18, 20 with a plug or cap 36 when an additional drying unit 10 is not connected to the unit 10. It is understood that the inlet and outlet pipes 18, 20 could be connected to the compressed air system of the facility on the same side of the drying unit 10 or on opposite sides as desired. It may also be desirable to provide pressure measurement taps in the air inlet and outlet pipes 18, 20 to measure pressure drop across the drying unit 10.

A similar arrangement may be used for the coolant pipes 38, 40 as well. The inlet 38 and outlet 40 coolant pipes allow the coolant to flow into and out of the main cooler 14. Preferably, the coolant pipes 38, 40 are cut and shaped to the side of the main cooler 14 and are welded 42 to the main cooler 14. Like the air inlet and outlet pipes 18, 20, the coolant flows laterally from the respective pipe 38, 40 to enter and exit the main cooler 14. The coolant pipes 38, 40 are also preferably the same length and aligned with each other so that the end openings 44 of the two pipes 38, 40 extend out from the drying unit 10 the same length. It is understood that various arrangements may be used for the coolant pipes 38, 40 depending on the particular application and depending on whether a liquid coolant or a refrigerant is used.

One advantage of the drying unit 10 is that it may be chained together with multiple drying units 10 to increase capacity. It is understood that because the air drying units 10 have a common design manufacturing the units 10 may be more efficient. Also, performing maintenance on the units 10 in operation may be easier due to their commonality. Because adding each additional unit 10 increases capacity in an additive fashion, compressed air demand can also be matched more closely and capacity may be added to a factory at a later time if needed merely be adding additional drying units 10.

By connecting the air inlet pipes and air outlet pipes of multiple drying units 10 together, the drying units 10 are arranged in parallel with each other between the compressed air supply and the compressed air demand. In other words, when multiple air drying units 10 are connected together and operating simultaneously, the compressed air flow from the supply is split into separate portions that flow through separate drying units 10. Thus, where there are two drying units 10 connected together, the compressed air flow will be divided in half due to the pressure differences so that half the compressed air flows from the air inlets 18 through each drying unit 10. The portions are then recombined at the air outlets 20 after flowing through the multiple drying units 12 in order to be supplied to the compressed air demand. Therefore, by connecting the air inlet pipes 18 together and the air outlet pipes 20 together of multiple units 10, the connected pipes 18, 20 act as a common inlet header and a common outlet header. The air inlet and outlet pipes 18, 20 can be connected to a coupling or fitting, such as a tee, elbow or straight pipe section which may act as a central pipe carrying compressed air to the assembly. The tee, elbow or straight pipe may be used to connect to the compressed air system of the facility. An inlet filter and/or outlet filter with the same type of grooved connection or flanged connection may also be connected to the drying unit 10 assembly to filter the compressed air entering and exiting the assembly.

Figure 5A:
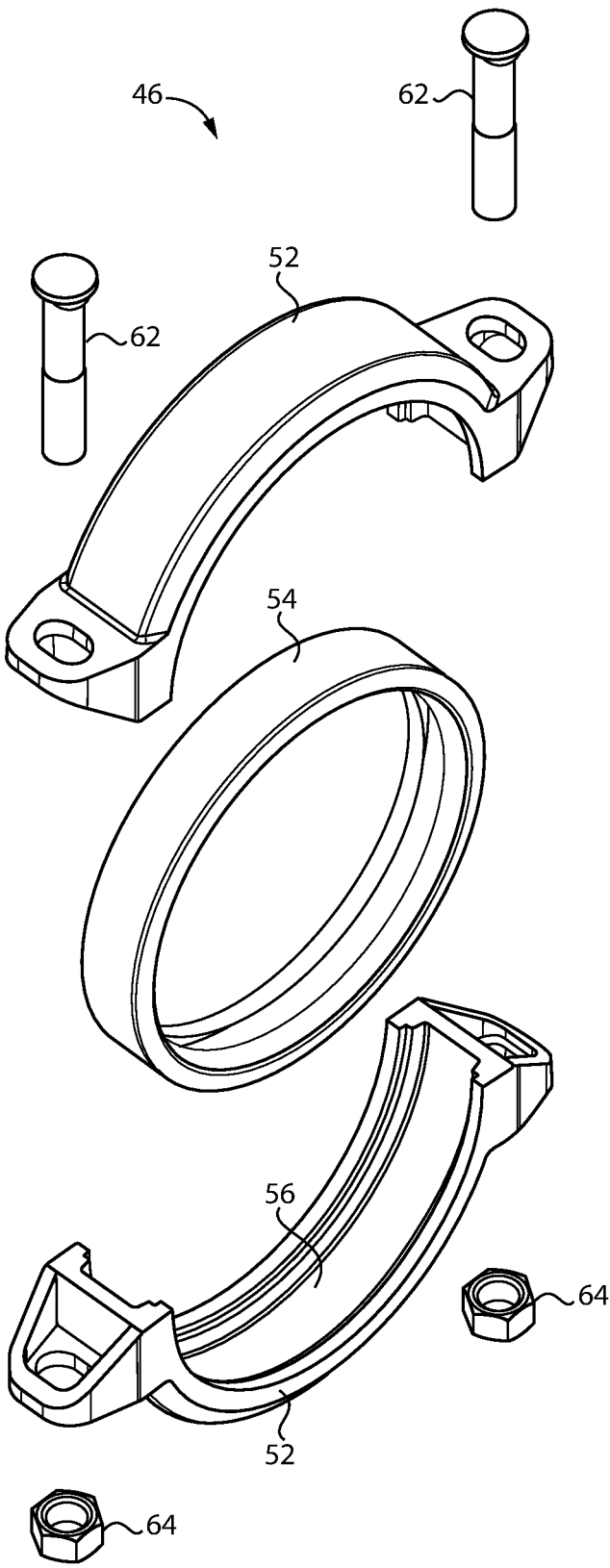
FIG. 5A is an exploded view of a clamp.
Figure 5B:
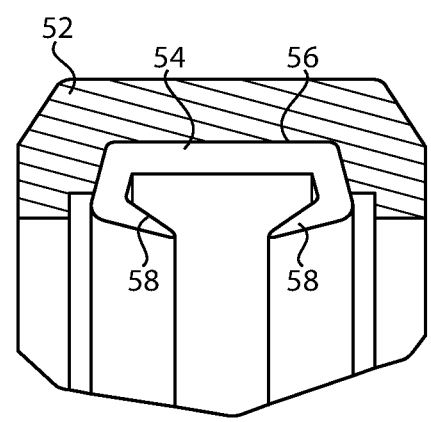
FIG. 5B is a cross section of a portion of the clamp of FIG. 5A.

The air inlet pipes 18 and the air outlet pipes 20 are preferably each connected together with a clamp 46 that wraps around the ends 34 of two adjacent pipes 18, 20. Thus, the units 10 are not connected together with intervening pipes, but are located directly adjacent each other with a single clamp 46 connecting two adjacent pipe ends 34 together. As shown in FIGS. 5A-5B, the clamps 46 may have rigid (e.g., metal) half round clamp members 52 with a circular groove 56 therein. A flexible round seal (e.g., plastic) 54 may be located in the central groove 56 of the clamp members 52. The seal 54 may have ends 58 that are pressed into corresponding grooves 60 in the air inlet and outlet pipes 18, 20. Bolts 62 and nuts 64 may be used to tighten the two clamp members 52 together and squeeze the seal 54 against the ends 34 of the pipes 18, 20.

A similar connection may be made with the coolant inlet pipes 38 and the coolant outlet pipes 40. Thus, the coolant pipes 38, 40 may be directly connected to corresponding adjacent coolant pipes 38, 40 with a pipe coupler (e.g., a swivel connector) without intervening pipes. Like described above, this results in the coolant pipes 38, 40 acting as common headers where the coolant is split evenly between the main coolers 14 of the units 10 so that equal portions flow from the coolant inlet pipes 38 into the main coolers 14, and the coolant is recombined in the coolant outlet pipes 40 after flowing through the main coolers 14. This arrangement would be particularly useful where a liquid coolant is used in contrast to a refrigerant which would preferably be fed directly to each main cooler separately.

Therefore, it can be seen that the air drying units 10 can be easily added together to satisfying increased compressed air demand while providing a compact package and common design. In addition to connecting the drying units 10 together with the pipes 18, 20, 38, 40 and connecting fasteners 46, 48, it may also be desirable to provide additional structural supports 50 that are connected to multiple drying units 10 to securely connect the units 10 together.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An air drying unit for compressed air, comprising:
   a first pipe having a sidewall that defines a first opening and a second opening, the first opening opposite to the second opening, the first opening configured to receive incoming compressed air, the first pipe including an air inlet located on the sidewall between the first opening and the second opening;
   a second pipe having a sidewall that defines a first opening and a second opening, the first opening opposite to the second opening, the second pipe including an air outlet located on the sidewall between the first opening and the second opening, the air outlet configured to receive outgoing compressed air;
   a precooler/reheater connected to the air inlet and the air outlet, the precooler/reheater being a first heat exchanger between incoming compressed air from the air inlet and outgoing compressed air to the air outlet, wherein the incoming compressed air is cooled by the outgoing compressed air and the outgoing compressed air is warmed by the incoming compressed air, the sidewall of the first pipe and the sidewall of the second pipe directly coupled to the precooler/reheater;
   a main cooler connected to the precooler/reheater such that the incoming compressed air enters the main cooler after exiting the precooler/reheater, the main cooler being a second heat exchanger between the incoming compressed air and a coolant, wherein the coolant cools the incoming compressed air and causes moisture to condense from the incoming compressed air; and
   a moisture separator connected to the main cooler, the moisture separator separating the moisture from the incoming compressed air, the incoming compressed air thereby being dried and defining the outgoing compressed air, the outgoing compressed air entering the precooler/reheater from the main cooler and the moisture separator;
   wherein the precooler/reheater, the main cooler and the moisture separator define a unit that is integral such that the incoming compressed air and the outgoing compressed air flow through and between the precooler/reheater, the main cooler and the moisture separator through internal passages within the unit and the unit being sealed such that the incoming compressed air and the outgoing compressed air is contained therein between the air inlet and the air outlet.

2. The air drying unit according to claim 1, wherein the precooler/reheater and the main cooler are offset and partially overlapping each other such that the incoming compressed air flows laterally from the precooler/reheater to the main cooler.

3. The air drying unit according to claim 2, wherein the precooler/reheater is partially above the main cooler and the main cooler is offset along a lower side of the precooler/reheater.

4. The air drying unit according to claim 1, wherein the moisture separator is below the main cooler such that moisture is separated by gravity and the outgoing compressed air changes direction to flow upward from the moisture separator to the precooler/reheater.

5. The air drying unit according to claim 1, wherein the precooler/reheater is welded to the main cooler.

6. The air drying unit according to claim 1, wherein the moisture separator is welded to the main cooler and welded to the precooler/reheater.

7. The air drying unit according to claim 1, wherein at least one of the first pipe or the second pipe are welded to the precooler/reheater.

8. The air drying unit according to claim 1, wherein the first opening of the first pipe and the first opening of the second pipe are aligned with each other and the second opening of the first pipe and the second opening of the second pipe are aligned with each other.

9. The air drying unit according to claim 1, wherein the main cooler comprises a coolant inlet pipe with an opening at each end of the coolant inlet pipe, the coolant flowing laterally from the coolant inlet pipe to the main cooler.

10. The air drying unit according to claim 9, wherein the coolant inlet pipe is welded to the main cooler.

11. The air drying unit according to claim 9, wherein the main cooler comprises a coolant outlet pipe with an opening at each end of the coolant outlet pipe, the coolant flowing laterally to the coolant outlet pipe from the main cooler.

12. The air drying unit according to claim 11, wherein the coolant outlet pipe is welded to the main cooler.

13. Two of the air drying unit according to claim 1,
further comprising a first clamp configured to couple the first pipes of the two air drying units together and a second clamp configured to couple the second pipes of the two air drying units together;
wherein air flowing through the first pipes flows evenly into the air inlets of the two air drying units and air flowing through the second pipes flows evenly into the second pipes from the air outlets of the two air drying units.

14. The two of the air drying unit according to claim 13, wherein the first and second clamps each comprise two rigid half round clamp members and a flexible seal disposed within the clamp members.

15. The two of the air drying unit according to claim 14, wherein the flexible seal is disposed within a groove in the end of each of the first and second pipes.

16. The two of the air drying unit according to claim 13, wherein the main cooler of each air drying unit comprises a coolant inlet pipe with an opening at each end of the coolant inlet pipe, the coolant flowing laterally from the coolant inlet pipes to the respective main cooler, and the ends of the coolant inlet pipes being connected to each other, the coolant flowing evenly from the coolant inlet pipes into the main coolers of the two air drying units.

17. The two of the air drying unit according to claim 16, wherein the main cooler of each air drying unit comprises a coolant outlet pipe with an opening at each end of the coolant outlet pipe, the coolant flowing laterally to the coolant outlet pipes from the respective main cooler, and the ends of the coolant outlet pipes being connected to each other, the coolant flowing evenly into the coolant outlet pipes from the main coolers of the two air drying units.

18. An air drying unit for compressed air, comprising:
an air inlet and an air outlet;
a precooler/reheater connected to the air inlet and the air outlet, the precooler/reheater being a first heat exchanger between incoming compressed air from the air inlet and outgoing compressed air to the air outlet, wherein the incoming compressed air is cooled by the outgoing compressed air and the outgoing compressed air is warmed by the incoming compressed air;
a main cooler connected to the precooler/reheater such that the incoming compressed air enters the main cooler after exiting the precooler/reheater, the main cooler being a second heat exchanger between the incoming compressed air and a coolant, wherein the coolant cools the incoming compressed air and causes moisture to condense from the incoming compressed air;
a moisture separator connected to the main cooler, the moisture separator separating the moisture from the incoming compressed air, the incoming compressed air thereby being dried and defining the outgoing compressed air, the outgoing compressed air entering the precooler/reheater from the main cooler and the moisture separator;
a coolant inlet pipe having a sidewall that defines a first opening and a second opening, the first opening opposite to the second opening, the first opening configured to receive incoming coolant, the first coolant pipe including an inlet located on the sidewall between the first opening and the second opening, the inlet fluidly coupled to the main cooler for supplying the incoming coolant, the sidewall of the coolant inlet pipe directly coupled to the main cooler; and
a coolant outlet pipe having a sidewall that defines a first opening and a second opening, the first opening opposite to the second opening, the coolant outlet pipe including an outlet located on the sidewall between the first opening and the second opening, the outlet fluidly coupled to the main cooler for receiving outgoing coolant, the sidewall of the second coolant pipe directly coupled to the main cooler;
wherein the precooler/reheater, the main cooler, and the moisture separator define a unit that is integral such that the incoming compressed air and the outgoing compressed air flow through and between the precooler/reheater, the main cooler, and the moisture separator through internal passages within the unit and the unit being sealed such that the incoming compressed air and the outgoing compressed air is contained therein between the air inlet and the air outlet.

19. Two of the air drying unit according to claim 18, wherein each respective coolant inlet pipe of the two air drying units are fluidly coupled together, the incoming coolant flowing laterally from each coolant inlet to the respective main cooler.

20. Two of the air drying unit according to claim 18, wherein each respective coolant outlet pipe of the two air drying units are fluidly coupled together, the outgoing coolant flowing laterally to each coolant outlet from the respective main cooler.

* * * * *